United States Patent
Upadhyay et al.

(10) Patent No.: US 11,554,828 B2
(45) Date of Patent: Jan. 17, 2023

(54) FRAME FOR AN ELECTRIC VEHICLE

(71) Applicant: Bajaj Auto Limited, Akurdi (IN)

(72) Inventors: Prashant Premnath Upadhyay, Akurdi (IN); Jayesh Sharad Chaudhari, Akurdi (IN); Amit Jain, Akurdi (IN)

(73) Assignee: Bajaj Auto Limited, Akurdi (IN)

( * ) Notice: Subject to any disclaimer, the term of this patent is extended or adjusted under 35 U.S.C. 154(b) by 82 days.

(21) Appl. No.: 17/413,636

(22) PCT Filed: Dec. 11, 2019

(86) PCT No.: PCT/IN2019/050911
§ 371 (c)(1),
(2) Date: Jun. 14, 2021

(87) PCT Pub. No.: WO2020/121331
PCT Pub. Date: Jun. 18, 2020

(65) Prior Publication Data
US 2022/0041244 A1   Feb. 10, 2022

(30) Foreign Application Priority Data
Dec. 13, 2018   (IN) .............................. 201821047188

(51) Int. Cl.
*B62K 11/02*   (2006.01)
*B62J 43/28*   (2020.01)
*B62J 43/16*   (2020.01)
*B62J 11/00*   (2020.01)

(52) U.S. Cl.
CPC .............. *B62K 11/02* (2013.01); *B62J 11/00* (2013.01); *B62J 43/16* (2020.02); *B62J 43/28* (2020.02); *B62K 2202/00* (2013.01)

(58) Field of Classification Search
CPC .... B62K 11/00; B62K 11/02; B62K 2202/00; B62J 43/16; B62J 43/28
See application file for complete search history.

(56) References Cited

U.S. PATENT DOCUMENTS

| | | | |
|---|---|---|---|
| 5,460,234 A | 10/1995 | Matsuura et al. | |
| 8,905,170 B2* | 12/2014 | Kyoden | B62J 43/28 180/68.5 |
| 9,136,514 B2* | 9/2015 | Kawatani | H01M 50/20 |
| 10,637,024 B2* | 4/2020 | Suzuki | H01M 50/20 |
| 2005/0092538 A1* | 5/2005 | Baldwin | B62K 11/10 180/220 |
| 2013/0161108 A1 | 6/2013 | Watanabe et al. | |
| 2015/0122563 A1* | 5/2015 | Kondo | H01M 10/625 180/68.5 |
| 2017/0113556 A1 | 4/2017 | Nakamura | |
| 2018/0339584 A1 | 11/2018 | Chen et al. | |
| 2020/0031425 A1* | 1/2020 | Aunkst | B60K 1/00 |
| 2020/0398923 A1* | 12/2020 | Griffith | B62J 43/16 |

* cited by examiner

*Primary Examiner* — Tony H Winner

(57) ABSTRACT

A frame for an electric vehicle (10) comprising: a head pipe (12) and at least two rear tubes (13) extending rearwardly from the head pipe (12); an electric battery module (24) used as a power source for powering the electric vehicle comprising at least one battery located below rear portion (13B) of said rear tubes (13); a protective frame structure (23) for securely mounting said battery module (24); wherein said protective frame structure (23) is fixed to said rear tubes (13) of said frame and provided substantially centrally and downwardly of said vehicle (10).

19 Claims, 15 Drawing Sheets

FRAME FOR AN ELECTRIC VEHICLE

CROSS-REFERENCE TO RELATED APPLICATION

This application is the National Stage of, and therefore claims the benefit of, International Application No. PCT/IN2019/050911 filed on Dec. 11, 2019, entitled "A FRAME FOR AN ELECTRIC VEHICLE," which was published in English under International Publication Number WO 2020/121331 on Jun. 18, 2020, and has a priority date of Dec. 13, 2018, based on application 201821047188. Both of the above applications are commonly assigned with this National Stage application and are incorporated herein by reference in their entirety.

FIELD OF THE INVENTION

This invention relates to electric vehicles and more particularly to a frame structure allowing packaging of one or more batteries within electric vehicles, particularly 2 wheeler (2W) vehicles.

BACKGROUND TO THE INVENTION

A strong trend to electric vehicle manufacture and use is now becoming evident as concerns with climate change and availability of fossil fuels become evident. Electric vehicles include a number of batteries including a large number of electric cells. The number of batteries required for an application is driven largely by the required vehicle range. At the present time, readily available batteries remain bulky and this may limit their use particularly where desired vehicle range conflicts with small vehicle size.

For example, small vehicles which currently operate using liquid and gaseous hydrocarbon fuels could advantageously be shifted to electric motor prime movers to reduce emissions. An initial trend to reduced emission prime movers has involved transition from petrol operated engines to gaseous fueled engines, for example of the LPG or CNG type. This has reduced emissions. However, proposed changes in regulations, for example in India, is driving a shift to electrically powered vehicles. The timeline for such shift is short and there are obvious difficulties in reconfiguring a vehicle fleet to operate with electric motors. Vehicle re-design and re-configuration of manufacturing plants for electric vehicle manufacture is a potentially time consuming and costly exercise. Yet it is desirable to meet directives/focus set by the Government of various countries.

Batteries are typically expensive, are typically (though not always) intended to be used in groups and are typically intended to be rechargeable. This gives rise to two problems. Firstly, batteries are subject to theft and it would be desirable to avoid this with a number of options for anti-theft protection being available. Secondly, the expense of high quality batteries may also create a temptation to replace these with inferior versions which may not include the safety features described below. Battery security is particularly an issue for 2W vehicles such as motorcycles and scooters. However, there are other non-enclosed electrical vehicle types, such as quad bikes and other all terrain vehicles (ATVs), and battery security may equally be an issue with such vehicle types.

Further, a battery needs to be safely and securely mounted on the vehicle such that it is locked in the correct position such that no movement is allowed in any direction due to vibrations produced during vehicle operation. Use of separate battery box for securely mounting the battery may be employed for securely mounting the batteries. However, such battery box are bulky and occupies more space. Therefore, the floor space/leg space and storage space both are compromised which is one of the essential requirement of two wheeled vehicle. The battery is one of the heaviest components in a vehicle. In a two wheeled vehicle, equal weight distribution along the vehicle is an important criterion since a driver needs to balance the weight in order to balance the vehicle during driving. If the weight distribution within a vehicle is uneven then it becomes difficult for driver to maintain the balance which can ultimately lead to unsafe conditions. Therefore, a battery also needs to be located such that there will not be any uneven load acting on vehicle during operation.

In this regard, a battery typically being a heavier component, its positioning has a major contribution in deciding overall centre of gravity (CG) of the vehicle. For efficient operation it is always better if the CG of vehicle is shifted towards downward side of vehicle. It also improves vehicle handling, safety and driving comfort. However, a major challenge in shifting the battery toward downward side is swing arm has to be shifted backward which increases overall length of vehicle. The size of the battery is another important parameter which decides the capacity of a vehicle. The larger the capacity of a vehicle, the larger the size of the battery.

At the same time, another important component for a vehicle is the storage box is typically provided in two-wheeled vehicle to store any articles. Storage space provided in the storage box is also an important feature of any two-wheeled vehicle. The size and mounting position of a battery and other associated components desirably should not compromise space provided in the storage box even given the requirements for sufficient space to be available for securely mounting other associated components such as charger, Motor Control Unit (MCU), Auxiliary Battery etc.

The vehicle frame plays an important role in mounting a battery and associated components and, evidently, considering the above requirements, it is challenging to provide a frame structure for a two wheeled vehicle which can safely and securely mount battery and other associated components without compromising vehicle efficiency, safety driving comfort and the space for a storage box in an electric vehicle.

It is an object of the present invention to provide a frame for an electric vehicle which enables convenient and secure packaging of a vehicle battery and other associated components.

Another object of present invention is to provide a frame with battery mounting position such that battery does not exert any imbalance force with expected improvement in overall efficiency of an electric vehicle with driving comfort.

Yet another object of the present invention is to provide a frame for an electric vehicle which provides a convenient and compact and less bulky packaging arrangement for battery and associated components such that floor space/leg space and storage space are not compromised.

SUMMARY OF THE INVENTION

With this object in view, the present invention provides a frame for an electric vehicle comprising:
at least one head tube extending from a head pipe and at least two rear tubes extending rearwardly from the head tube;
an electric battery module preferably used as power source for powering the electric vehicle comprising at least one battery located below said rear tubes;

a protective frame structure for securely mounting said battery module;

wherein said protective frame structure for said electric battery module is fixed substantially centrally and downwardly of said rear tubes of said frame and said battery module is locked to the protective frame structure from front and rear side of the battery module.

Conveniently, the protective frame structure includes plurality of cross members connected to the rear tubes for structural purposes and also to allow secure and convenient fixing of the electric battery module. At least one cross member is used for connecting the rear tubes to create protective frame structure. Front and/or rear connecting cross members would typically be employed dependent on design considerations in terms of strength and components to be included, with a front cross member connecting the rear tubes towards the front of the vehicle and a rear cross member connecting the rear tubes towards the rear of the vehicle to support the electric battery module. Such cross member(s) are preferably connected to the electric battery module by suitable mounting means such as a mounting bracket. The front cross member may extend substantially horizontally over a top surface of the battery to restrict any vertical movement of the electric battery module. The rear cross member may be connected to the rear tubes proximate a rear side of the frame and conveniently extending downwardly from the rear tubes. A bottom cross-member is provided which connects the two rear tubes. The bottom cross member is connected to the rear cross member using connecting members in substantially horizontal direction to create a platform on which battery can securely reside and held in position with locking means, with the rear connecting member. A guiding means may be provided on the cross members of the protective frame structure and/or on the battery module for conveniently mounting and removing the battery from the protective frame structure. The guiding means may be in the form of guiding rails. The battery may be removed from either side, the back side or central front side of the vehicle for charging or swapping purposes.

The electric battery module is connected to the protective frame structure with locking means from front side and from rear side with the objects of minimising vibration, loosening of the electric battery module from the frame resulting in either or both of vertical and lateral movement and prevention of theft. Suitable locking means/brackets may be provided on the front and rear side of the battery module. The battery is securely mounted in the protective frame with the help of locking means therefore; no separate battery box is required for mounting the battery module securely thereby not compromising the storage space provided in the storage box. The locking means provided on the rear side of the battery module including a rear mounting bracket used to lock the battery position from rear side by clamping said rear mounting bracket to the side brackets from both sides of the battery module and further locked by clamping the battery module to the side brackets using a bolt provided in a groove on the battery module wherein; said side brackets are fixed to protective frame structure. The battery securing structure conveniently includes an opening to enable access for the battery module prior to connection, this opening preferably being on a rear side of the battery. The rear side access to the battery makes battery removing operation difficult thereby providing more protection from theft perspective. Horizontal location of the battery is thus preferred though vertical positioning may be used. Vibration isolating elements are desirably placed between the electric battery module and the battery securing structure to reduce vibrations being transmitted to the electric battery module and reducing user comfort. Preferably, the electric battery module comprises a single battery; however, a battery module comprising a plurality of batteries may be used based on power requirements, vehicle design parameters and availability of space.

The electric battery module is a relatively heavy vehicle component. For a two wheeled vehicle, a substantially equal weight distribution along the length of the vehicle is highly desirable to enable a driver to balance weight distribution in order to balance the vehicle during driving. An uneven weight distribution within the vehicle, though possible, makes it difficult for a driver to maintain vehicle balance which can ultimately lead to unsafe conditions. Ideally, the battery or battery module is located centrally along the width of the vehicle, preferably at a central location along the length of the vehicle. The position of the battery plays an important role in defining the centre of gravity (CG) of the vehicle so where the battery is positioned in a downward position, desirably on a central lower side of the vehicle, shifting the CG of vehicle to substantially the same location is advantageous. Such CG location helps in improving overall efficiency of the vehicle also provides driving stability, safety and better handling of the vehicle. The battery module is packaged such that it does not extend forwardly beyond the dimensions of storage box when viewed from side of the vehicle. This ensure that the floor space/leg space and storage space are not compromised. Another advantage of such battery positioning centrally of the vehicle and centrally to the major portion of the vehicle electrical components is convenient positioning for wire harness routing. Further, since the battery is located in such a downward position, the design length of a swing arm increases. However, this problem is addressed by mounting motor-transmission assembly on swing arm with a casing for motor-transmission which itself acts as the required swing arm. Therefore the need of separate swing arm is eliminated and it helps in achieving the compact packaging.

Conveniently, a storage box is provided enable storage of articles including larger size articles such as a helmet. Such storage is separate to battery storage and the storage box is not directly rested on the battery surface or on the protective frame structure of battery. This assists in preventing damage to the battery or battery module.

Conveniently, the head pipe of vehicle frame allows mounting of the handle bar and steering assembly and at least one head tube extends from the head pipe in a rearward and downward. The head tube of the vehicle frame is further provided with a cross member which may be an integral part of the head tube or separately fixed to the head tube. Preferably, two rear tubes are attached to the head tube, the rear tubes extending in the rear direction of the frame. At least two longitudinal frame members may be provided on the cross member. The longitudinal members may be substantially horizontal and parallel to the horizontal portion of each of the two rear tubes. The horizontal longitudinal members and horizontal portions of the rear tubes allow mounting of at least one foot panel. One foot panel may be mounted on top of the longitudinal members from top side while a further foot panel may be mounted on the bottom of the longitudinal members. The respective sides of the foot panels are desirably covered with side members, conveniently creating a hollow space between the two foot panels which is advantageously utilized for various purposes, such as battery cooling, accommodating other components etc. as described below.

During operation (charging/discharging), battery temperature increases. In order to get the maximum efficiency of the battery and to prolong battery life, the battery is maintained at a desired temperature. Ideally, battery operation is stopped if battery temperature exceeds a pre-determined limit. Various battery heating and cooling options are available with air cooling systems being preferred. Cooling requirement will be more typical and to this end the battery is conveniently provided with a ram air cooling means, with front body panel(s) being configured with one or more vents so that ram air (i.e. the air flow through the vehicle during forward motion) flows over the battery and cools the battery.

The front body panel or guard may accommodate a cooling air duct communicating with the vents and desirably the above described space between the floor panels. Ram air entering through the vents then flows through the duct and into the hollow space between the floor panels to be guided by air guiding means towards the battery for cooling purposes, the components forming an air cooling system. The air guiding means is conveniently provided on the bottom floor panel. The air cooling system may further include air passage(s) directing air towards a targeted area of the battery surface to achieve effective cooling.

Further the hollow space created in the body panel is advantageously utilized for placing various electrical and electronic components such as auxiliary battery, wiring harness etc. which hides the wires and improves aesthetics of the vehicle. It also keeps the wire connections safe from any external threats.

The frame according to the present invention also provides convenient mounting means for other associated components such as Charger, Connectivity box, Motor control unit, DC-DC Converter etc. which helps in optimum packaging of components in an electric vehicle. The rear tube is provided with mounting means for mounting motor control unit (MCU 100) such that the MCU is mounted proximate to the electric battery module on the left hand side of the vehicle.

The MCU is configured to control the amount of torque to be produced by an electric motor by controlling the amount of current/voltage supplied based on at least one vehicle operating condition wherein; the amount of current/voltage to be supplied to the electric motor is decided based on a basic map of the amount of power to be supplied to the electric motor to generate required torque as a function of selected vehicle conditions including present vehicle speed and/or accelerator pedal or grip position.

The rear tube is provided with a mounting provision for mounting a DC-DC converter at the end of the rear tubes.

The head pipe is provided with mounting provision for mounting a connectivity box on the front side of the vehicle wherein; the connectivity box is configured to receive the information including battery information, vehicle speed, distance travelled, driving pattern, vehicle location, accident information and further configured to store and share the information with external device over suitable communication network including Wi-Fi, Bluetooth, Internet or telecommunication network.

The rear tube is provided with a mounting provision for mounting a charger unit used for charging battery module on right hand side of the vehicle.

The battery module is charged on board the vehicle using a charging cable to connect the charger to external supply through a charging point wherein; the charging point is provided on the rear end of the vehicle below seat such that the charging cable remains plugged and charges the battery even if the seat is closed and locked.

SHORT DESCRIPTION OF THE DRAWINGS

The electric vehicle of the present invention may be more fully understood from the following description of preferred embodiments thereof, made with reference to the accompanying drawings in which:

FIG. 4(a) is a partial isometric view of the protective frame structure showing clamping arrangement of rear mounting bracket of FIG. 4.

DESCRIPTION OF PREFERRED EMBODIMENT OF THE INVENTION

Figure 1:
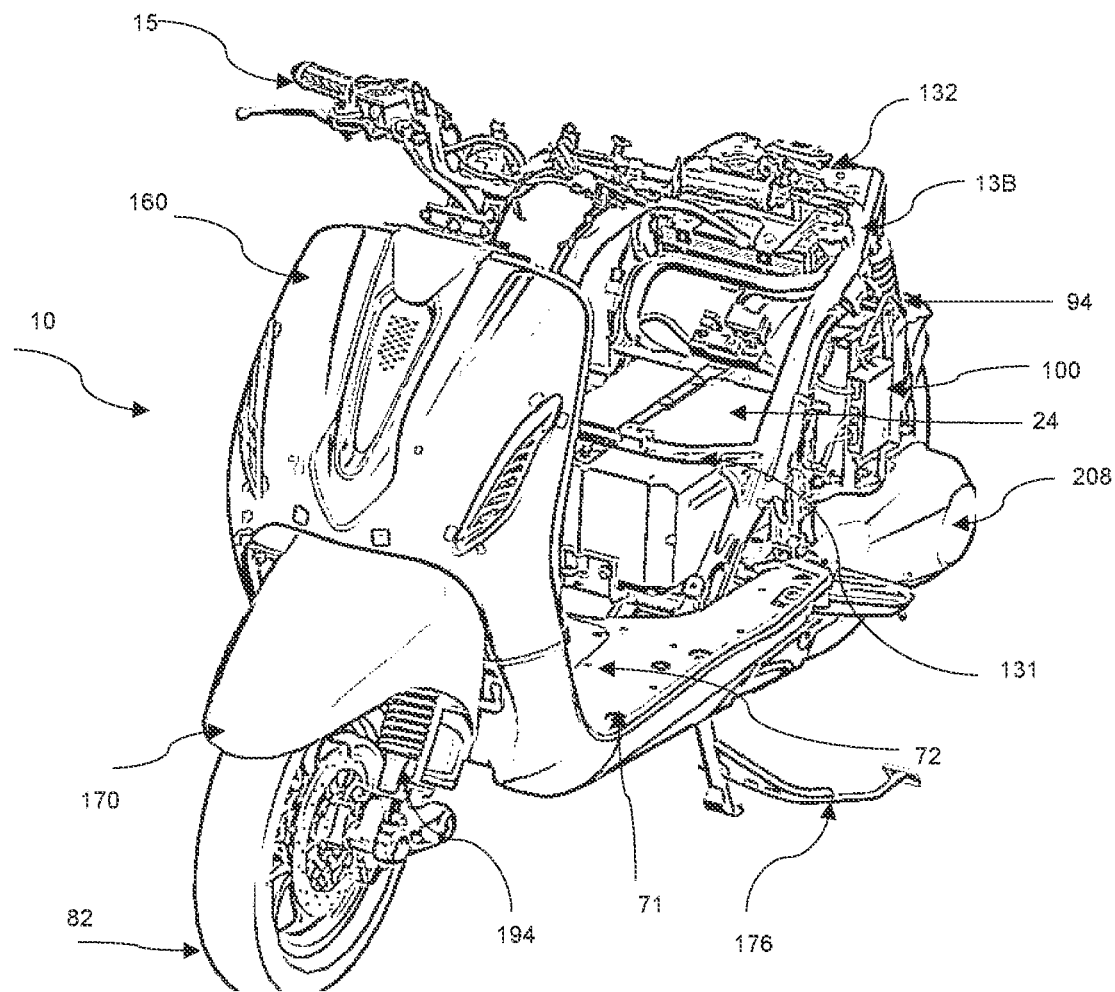
FIG. 1 is a partial isometric view of an electric vehicle according to a first embodiment of the present invention.
Figure 5:
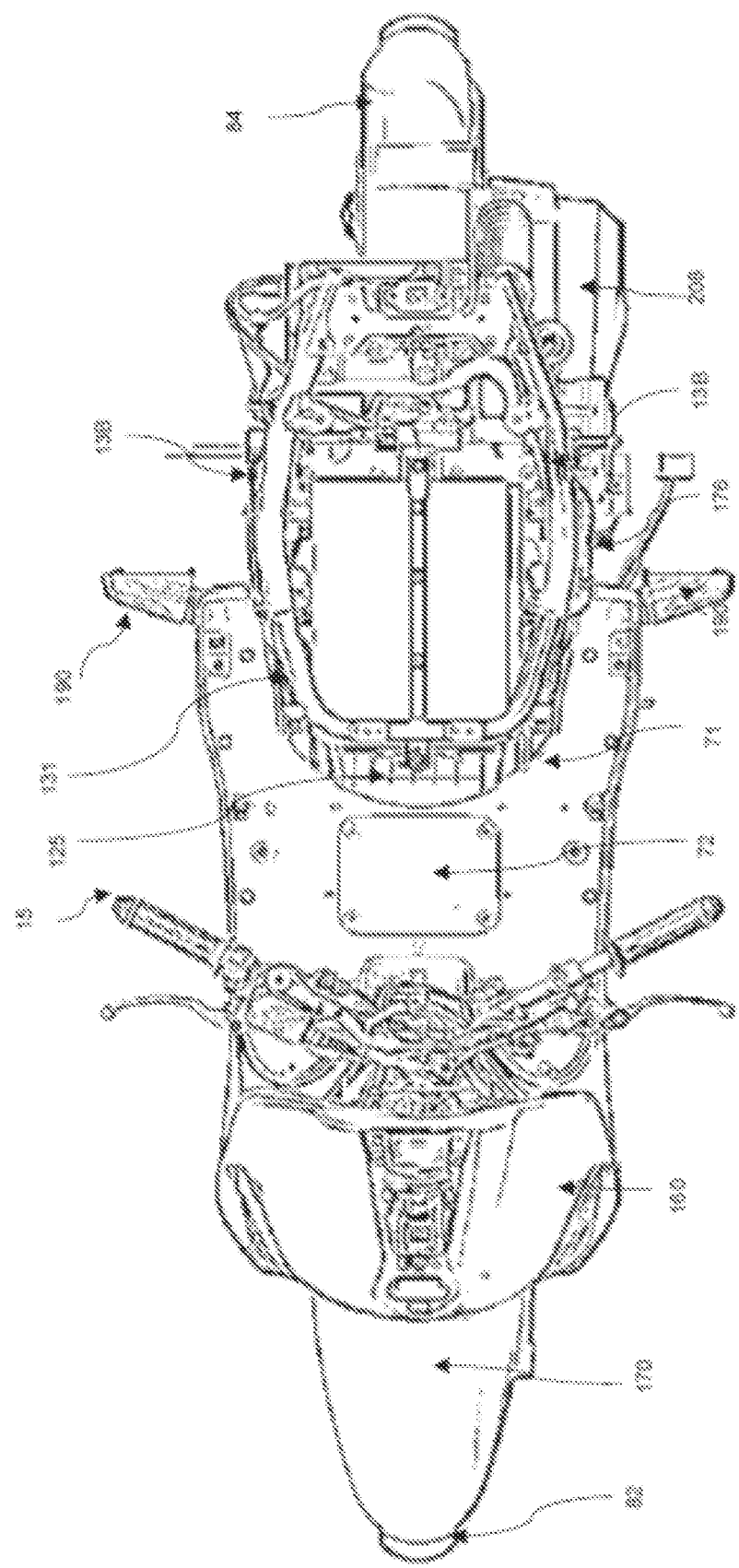
FIG. 5 is a partial plan view of the electric vehicle shown in FIG. 1.
Figure 7:
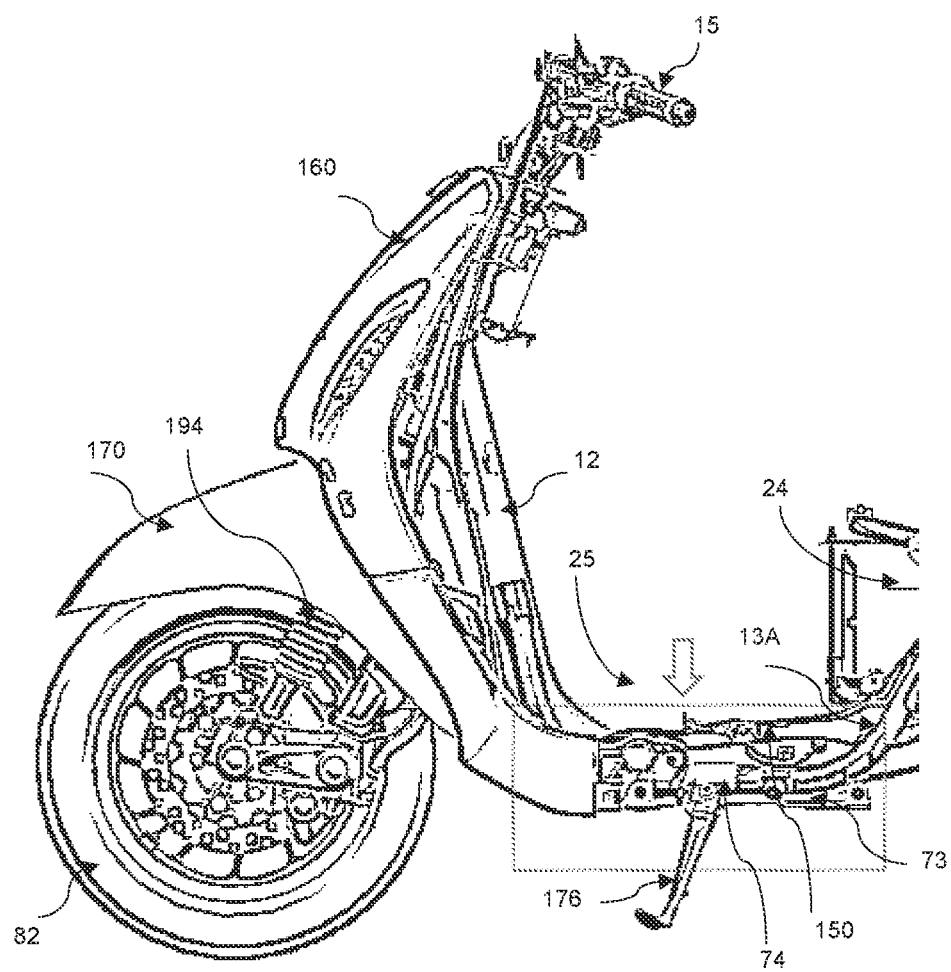
FIG. 7 is an isometric view of the frame from rear side of the electric vehicle shown in FIG. 1

Referring now to FIGS. 1, 5 and 7, there is shown an electric vehicle 10 suitable for use as a commuter vehicle and having a frame 11 having a head pipe 12; head tubes 12A, at least two rear tubes 13. Frame 11 is described in more detail below. The electric vehicle 10 is a two wheeler scooter including a front wheel 82 and rear wheel 84. Rear wheel 84 is provided with a swing arm suspension system described further below and a shock absorber 94 provided on the swing arm side of the vehicle 10. Scooter 10 is shown mounted on a stand 176 of conventional form.

The driver steers electric vehicle 10 through handlebar 15 which includes brakes and horn 15A. The driver is protected by front panel or guard 160 and front mudguard 170 and may comfortably place feet on a floor space 25 created on the floor board 71.

Electric vehicle 10 has an electric motor and transmission system, forming an integrated motor-transmission assembly 208, powered by an electric battery module 24 comprising a single battery as shown in FIGS. 1, 2, 4, 5 and 6. Electric battery module 24 is positioned to the rear of the vehicle 10 above the electric motor and transmission system 208, a position which provides a convenient position for routing the wire harness.

According to preferred embodiment, the electric motor has a rating of 7 kW to 10 kW (though this rating is dictated by application) and is controlled by motor control unit (MCU) 100. Batteries 24 are of conventional design each with 48 volt rating preferably connected in parallel so deliverable voltage is 48 volts.

Scooter 10 includes a frame 11 as mentioned above and this frame structure, which supports the electric battery module 24 and the motor-transmission assembly 208 along with further vehicle components. Frame 11, and in particular its rear tube 13 comprising battery protective frame structure, is now described in further detail.

The rear tubes 13 are each connected to a downward and rearward extending head tube 12A and extend towards rear side of vehicle. A forward portion 13A of rear tube 13 comprises a pair of horizontally extending tubes 13A. The rear portion of each of rear tubes 13B extends upwardly in the rearward direction of scooter 10 terminating in a relatively short near horizontal position with the rear tubes 13B converging towards each other and being connected with a cross member 132.

Key functions for the rear frame tube 13 are to support the electric battery module 24 and the other associated components. The following description shows how these objects are achieved. Rear frame tubes 13B are connected by three cross members 131, 133 and 134 as shown in FIGS. 2 to 5.

A bottom cross member 133 is connected to the rear tubes 13B proximate their bottom ends. Bottom cross member 133 has a portion in the form of a horizontal platform 133A on which battery module 24 can be easily supported. The vertical plate portion 133C of the cross member 133 prevents forward movement of the battery module 24.

A second U shaped front cross member 131 also connects the rear tubes 13B toward their mid-section such that when battery module 24 is secured in position, as described further below, cross-member 131 will restrict opportunities for removal, especially by theft, as well as placing a restriction on vertical movement of the battery module 24.

A rear connecting member 134 connects rear tubes 13B, of vehicle frame extending in a downward direction and is connected with a rear mounting bracket 135 which also enables connection to an upper surface of the battery module 24. According to one of the embodiment, the rear mounting bracket is fixed to the protective frame structure (23) using side brackets 135a on both the side of battery module 24. The side brackets (135a) is fixed to the cross member of protective frame (23) using additional brackets (130) as illustrated in FIG. 4(a). Once the battery 24 is mounted in the protective frame 23 it is locked in a position from rear side by clamping the rear mounting bracket 135 to the side brackets (135a) using nut and bolt 139c. The battery 24 is provided with at least one groove in which a bolt 139b is installed. The bolt 139c is further clamped to the side bracket (135a). The groove may be used as guiding means for removing and adjusting the battery 24 during swapping or changing purpose. The disposition of the cross members 131, 133 and 134 is selected to provide sufficient volume to accommodate the battery module 24 and will depend on the rating and dimensions of the battery module 24.

The rear frame portion 13 and the cross members 131, 133,134 are also configured to leave a rear opening 137 through which the battery module 24 can be located. Battery module 24 requires to be securely connected to the rear frame portion 13 and a number of locking means, in the form of nut and bolt fasteners, are used for this purpose. At the rear end, the battery module 24 is bolted to rear mounting bracket 135. At the forward end, as most conveniently shown in FIG. 4, the battery module 24 is connected to first forward cross member 133C by a connector including bolt 126, which extends the height of the battery module 24 and nut 125. To provide further security, a locking plate 124 extends from the rear of the battery module 24 where it is connected to rear mounting bracket 135 to the front of the battery module 24. At this location, the locking plate 124 is connected to the bolt 126 by nut 125. The battery 24 is securely mounted in the protective frame 23 with the help of locking means therefore; no separate battery box is required for mounting the battery module 24 securely thereby not compromising the storage space provided in the storage box 105.

Vibration isolating elements, such as damper 133B (shown in FIG. 3), are placed between the battery module 24 and the frame 11 to reduce vibrations from battery module 24 being transmitted to the vehicle frame 11.

Figure 6:
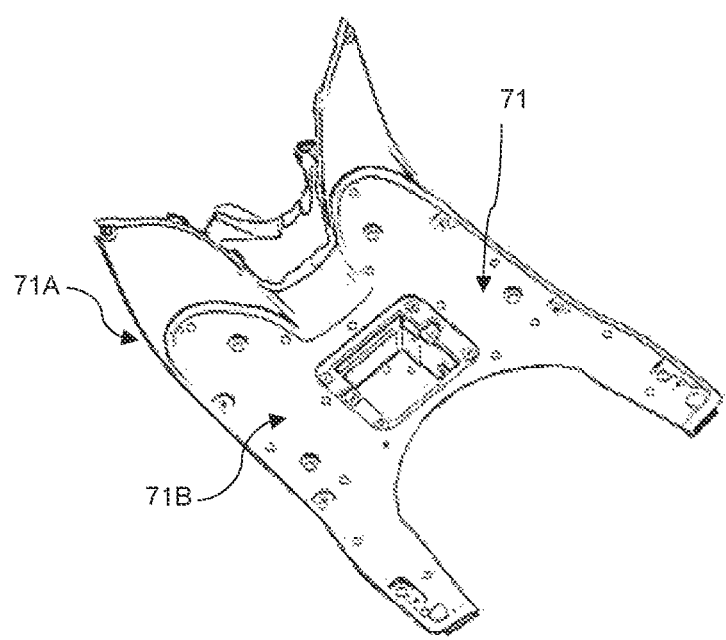
FIG. 6 is an isometric view of the frame of the electric vehicle shown in FIG. 1

The head tube 12A of the vehicle frame 11 is further provided with a cross member 151 separately fixed to the head tubes 12A. A pair of rearwardly extending longitudinal members 150 are connected to the cross member 151. Longitudinal members 150 extend substantially horizontal and parallel to the horizontal portion 13A of each of the two rear tubes 13. The horizontal longitudinal members and horizontal portions 13A of the rear tubes 13B allow mounting of a pair of foot panels 71 and 73. A foot panel 71 is mounted on top of the longitudinal members 150 while a further foot panel 73 is mounted on the bottom of the frame members 150 as shown in FIG. 7. The respective sides of the foot panels 71 and 73 are covered by side members, conveniently creating a hollow space 74 between the two foot panels 71 and 73 which space 74 is advantageously utilized for various purposes (as part of the cooling system and for accommodating an auxiliary battery) as described below. FIG. 6 shows greater detail of the front panel 160 and a foot supporting portion 71 which includes a cut-out portion for accommodating the rear frame portion 13 and the battery module 24 amongst other vehicle components.

Figure 12:
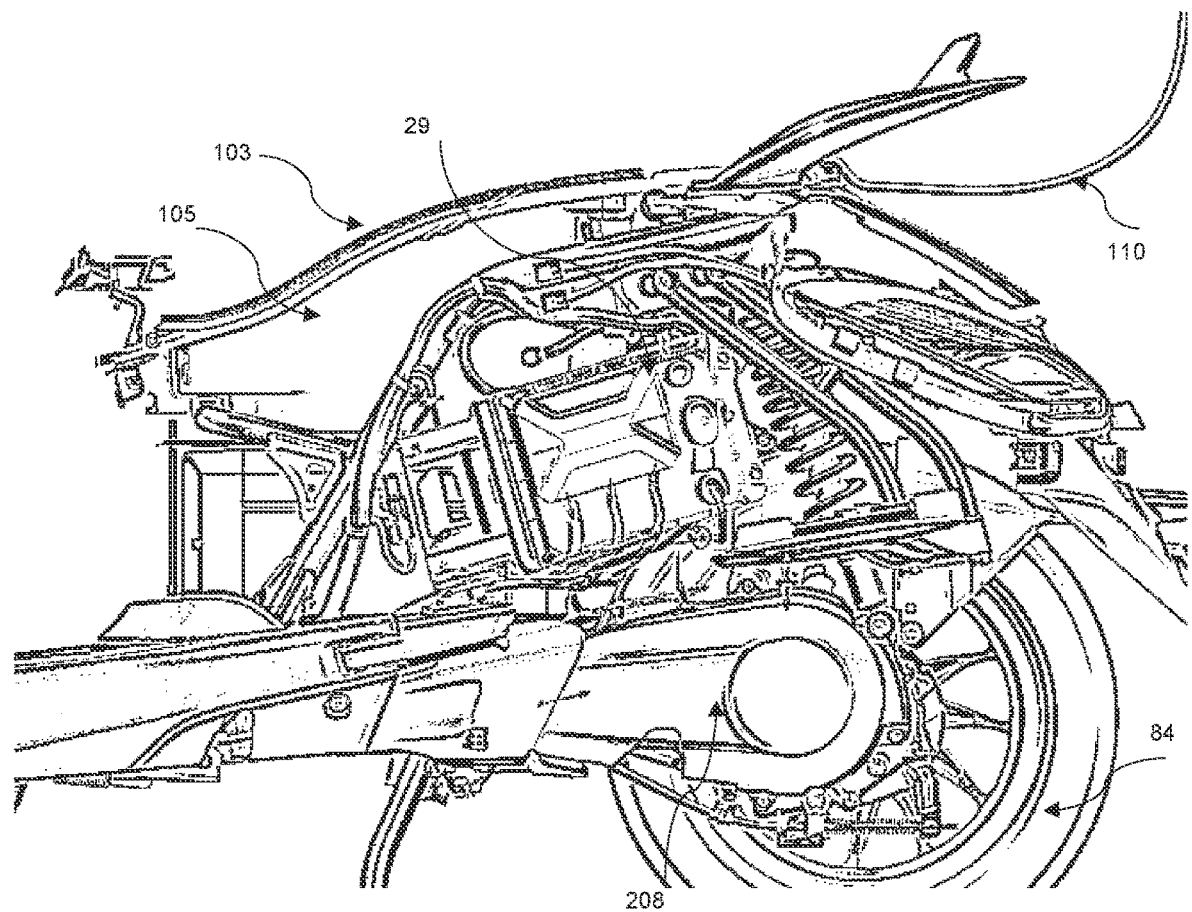
FIG. 12 is a first detail side view projected from FIG. 9 showing motor control unit, DC-DC converter, motor transmission assembly and shock absorber in relation to the rear frame portion of the electric vehicle of FIGS. 1 and 5.

Electric battery module 24 includes a protective frame structure 23. The battery module 24 is mounted such that it does not extend beyond the dimensions of storage box 105 when viewed from side of the vehicle as shown in FIG. 12. This ensure that the floor space 25 and storage space of storage box 105 are not compromised. The storage box 105 is not directly rested on the battery surface or on the protective frame structure 23 thereby, prevent any damage to the battery module 24 from the weight of luggage placed in the storage box 105.

During operation (charging/discharging), battery temperature increases. In order to get the maximum efficiency of the battery module 24 and to prolong battery life, the battery module 24 is maintained at a desired temperature. Ideally, battery operation is stopped if battery temperature exceeds a pre-determined limit. Cooling is often required and scooter 10 includes an air cooling system, specifically a ram air cooling system.

Figure 8:
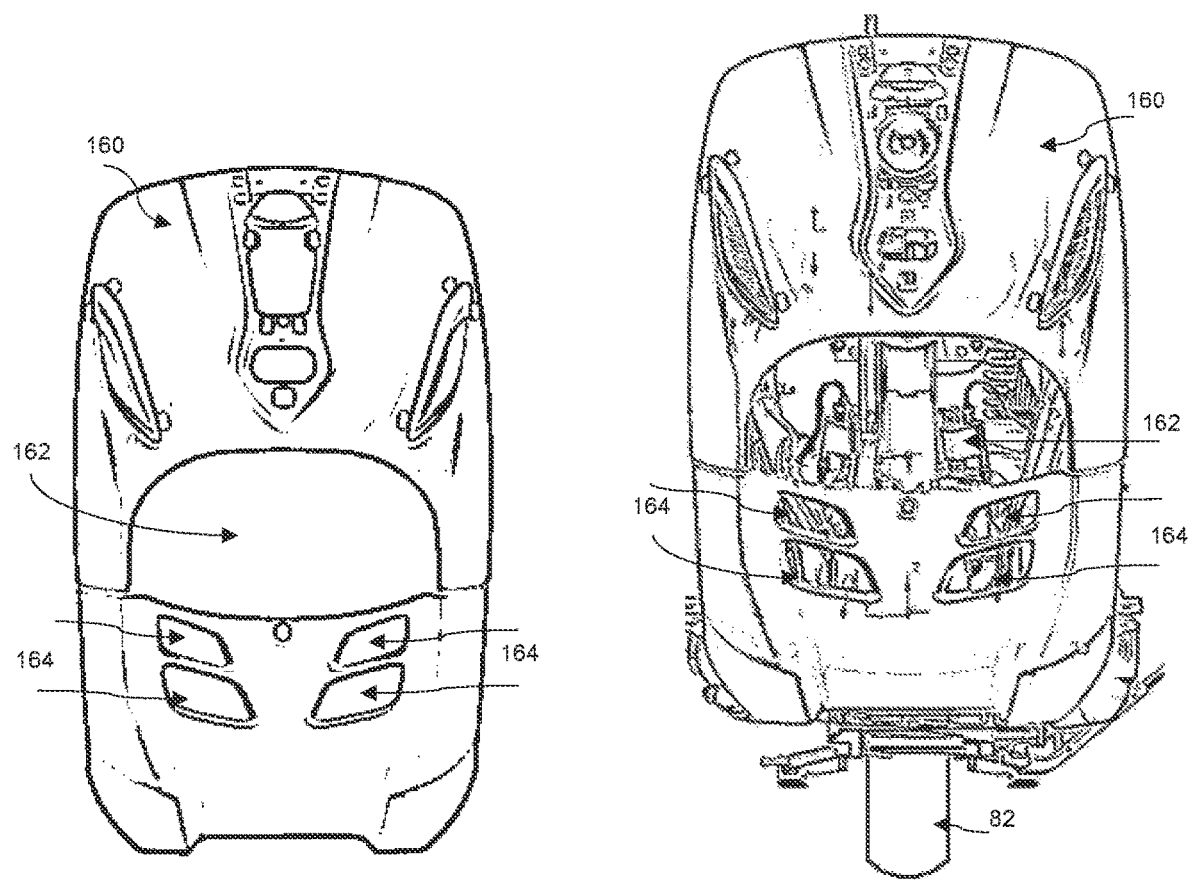
FIG. 8 is a detail view of the front body panel of the electric vehicle shown in FIGS. 1 and 5.
Figure 9:
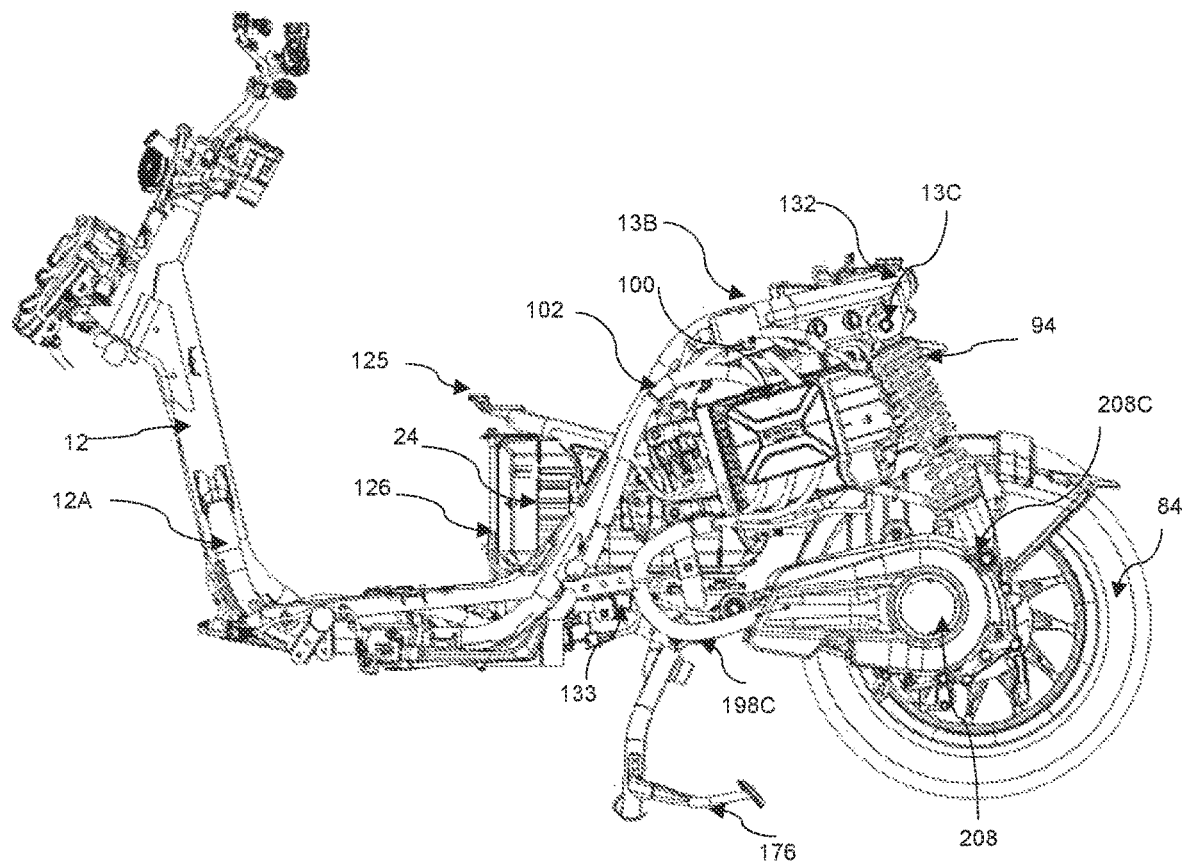
FIG. 9 is a schematic side view of the front portion of the electric vehicle of FIG. 1.

As shown in FIG. 8, front body panel 160 includes a number of vents 162 and 164 so that ram air (i.e. the air flow through the vehicle during forward motion) flows over the battery 24 for cooling purposes.

The front body panel 160 accommodates a cooling air duct communicating with the vents and desirably the above described space between the floor panels. Ram air entering through the vents then flows through the duct and into the hollow space 74 between the floor panels 71 and 73 to be guided by air guiding means towards the battery 24 for cooling purposes, the components forming an air cooling system. The air guiding means is conveniently provided on the bottom floor panel. The air cooling system may further include air passage(s) directing air towards a targeted area of the battery surface to achieve effective cooling.

Operation of electric motor (not shown) is controlled by Motor Control Unit (MCU) 100. The current supply to electric motor has to be AC while the current supplied from battery 24 is DC; the conversion from DC to AC is also controlled by MCU 100.

MCU 100 determines the amount of torque to be produced by electric motor based on various vehicle operating conditions along with the correspondent amount of current/voltage to be supplied to electric motor. MCU 100 comprises a basic map of the amount of power to be supplied to the electric motor to generate required torque as a function of selected vehicle conditions, for example present vehicle speed and accelerator pedal or grip position. Therefore, if scooter 10 is accelerated or decelerated, its torque requirement changes; similarly, if during various running conditions, the total load on scooter 10 changes, this reduces or increases the vehicle speed which changes the torque requirement. Based on vehicle speed and accelerator position, the required torque is determined from the basic map and accordingly the required electric power (current/voltage) is supplied to electric motor to generate the required torque under the control of MCU 100.

As shown in FIGS. 1 and 9 to 13, the MCU 100 is positioned near battery 24 on the rear side of vehicle 10 which results in reduced wiring harness 102 length in contrast to placing the MCU 100 on the front side of scooter 10. Placing the MCU 100 below the floor panels 71 and 73 would increase chance of damage due to external impacts. As shown, the MCU 100 is mounted on the left hand side of scooter 10. MCU 100 is fixed to the vehicle frame using mounting brackets.

Scooter 10 comprises a range of low voltage electric components such as headlamp, tail lamp, horns, Indicators and so on. In certain scenarios, these components need to be operated even if the vehicle 10 is not running, though the power requirement of these components is comparatively less than for the electric motor. Although, these components can run directly on the supply of the main battery 24, supplying these components with power from an alternative low voltage power source such as auxiliary battery, which is lower capacity/rating as compared to main battery 24 is advantageous. For example, using direct current from the main battery 24 to power the low voltage components can lead to safety issues. The auxiliary battery can also be used as a safety lock for vehicle 10 before starting the main battery 24. Conveniently, the auxiliary battery has 12V capacity and is very small in size as compared to the main battery 24.

The auxiliary battery is placed within the space created between the floor panels 71 and 73. The top floor panel 71 is provided with a small box type opening for accommodating the auxiliary battery. A cover 72 is fitted on top of the opening to secure the auxiliary battery into position. This convenient location for access for servicing also helps in easy routing of the vehicle wiring harness.

Figure 10:
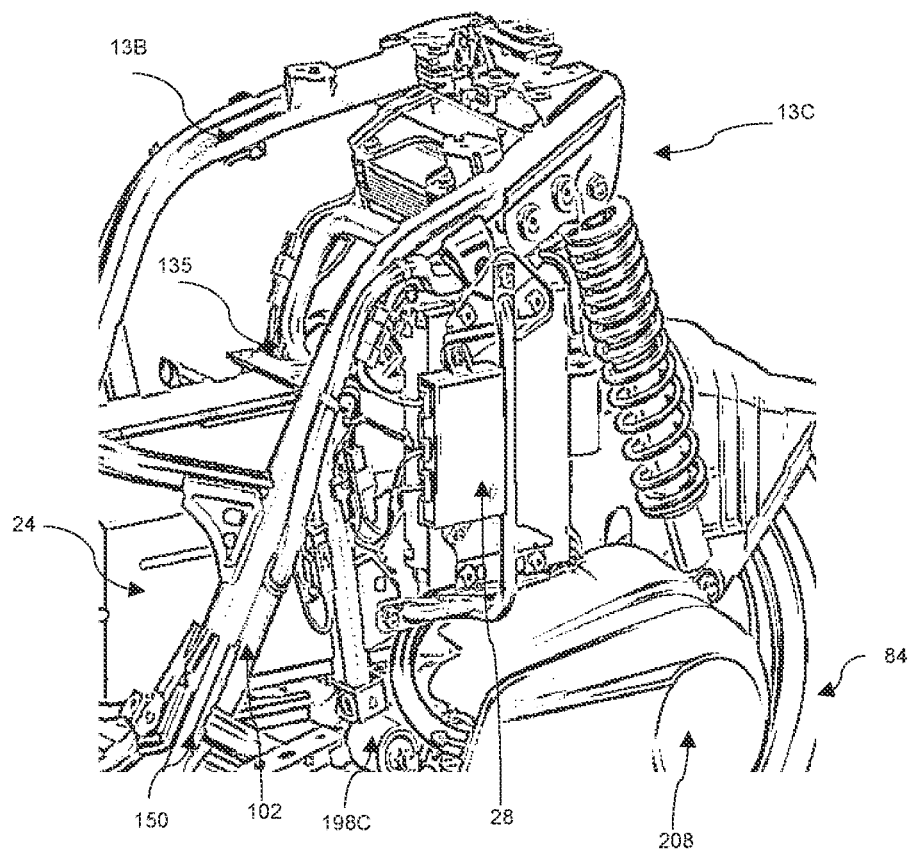
FIG. 10 is a partial front view of the electric vehicle of FIGS. 1 and 5.
Figure 11:
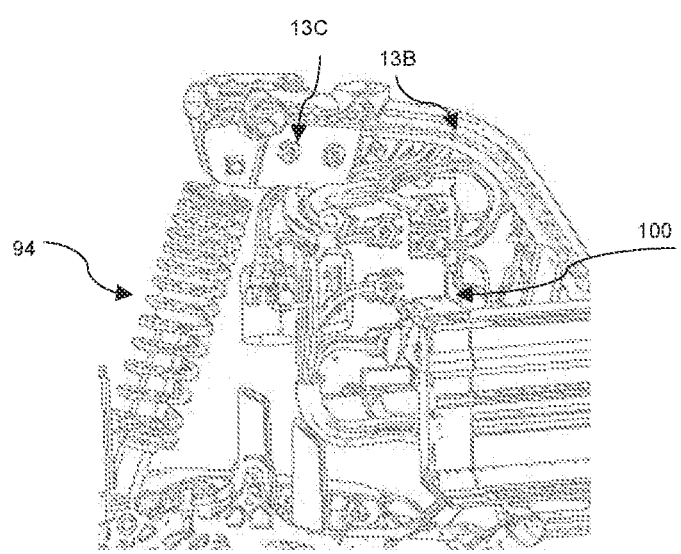
FIG. 11 is a partial side view of the electric vehicle of FIGS. 1 and 5.

A DC-DC convertor 28 is also mounted on the MCU 100 as shown in FIG. 10 using suitable mounting brackets. This helps in reducing the length of the wiring harness. The function of the DC-DC convertor 28 is to charge the auxiliary battery by taking current from the main battery 24. Since the auxiliary battery operates at much lower voltage than battery 24, a direct current from the 48 volt main battery 24 cannot directly be used to charge the auxiliary battery. DC-DC converter 28 steps down the voltage so that power from the main battery 24 can be used to charge auxiliary battery. According to another embodiment, the DC-DC converter 28 is packaged towards rear side of vehicle at ends of the rear tubes 13 as shown in FIGS. 14(a) and 14(b). The DC-DC convertor may be suitably covered by vehicle covering members.

Figure 2:
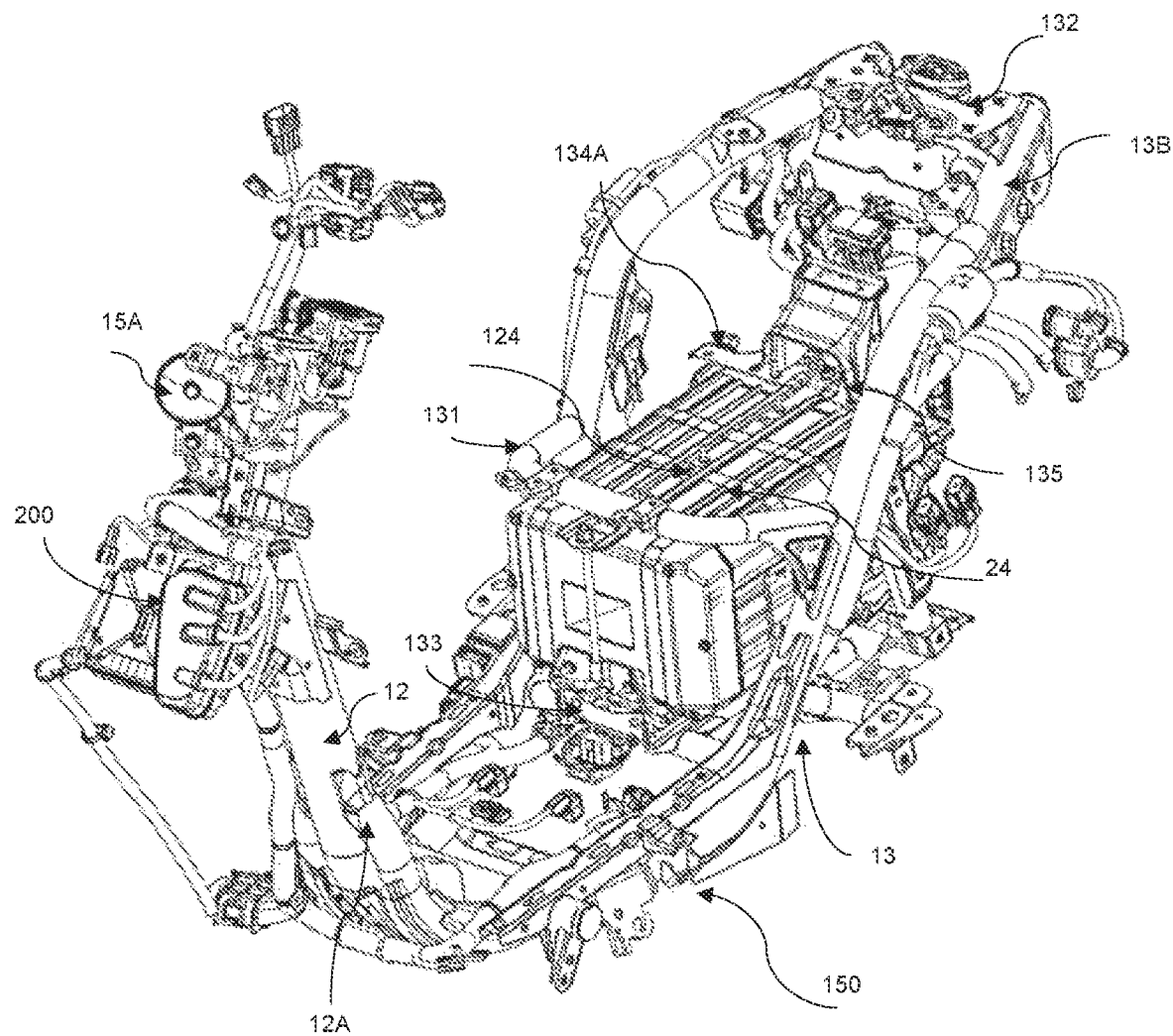
FIG. 2 is a partial isometric view of the frame of the electric vehicle of FIG. 1.
Figure 3:
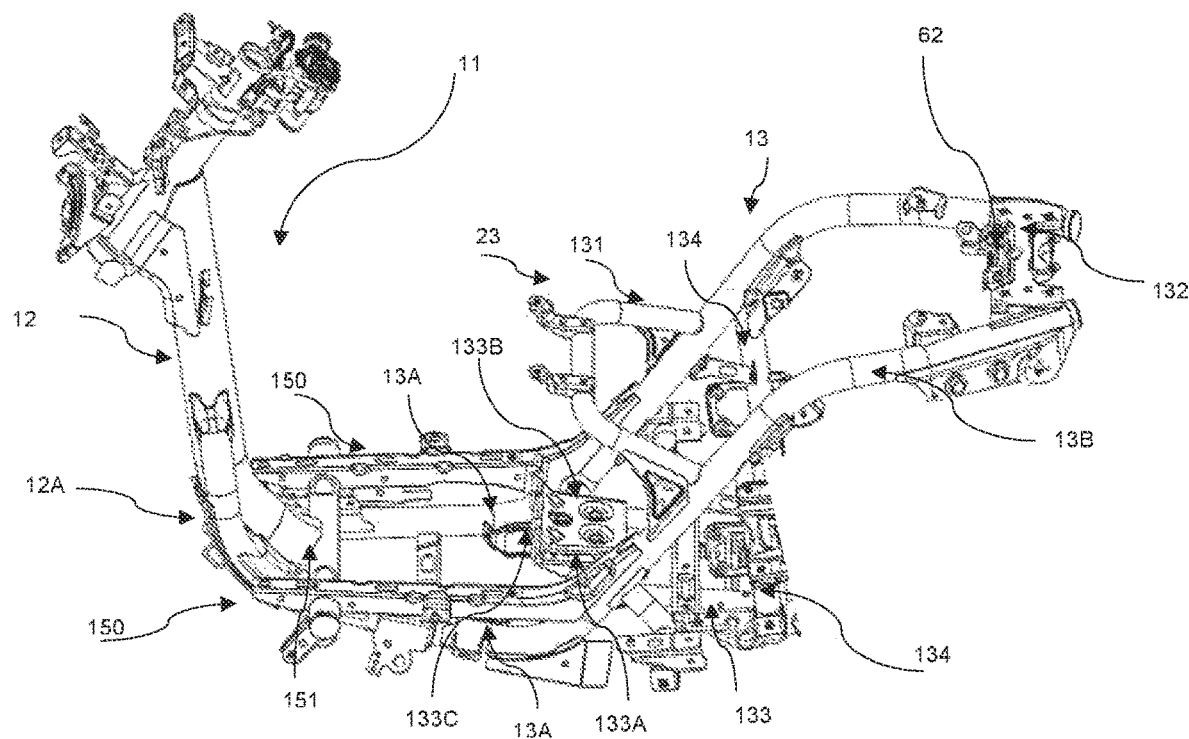
FIG. 3 is a partial side view of the frame of the electric vehicle of FIG. 1.
Figure 4:
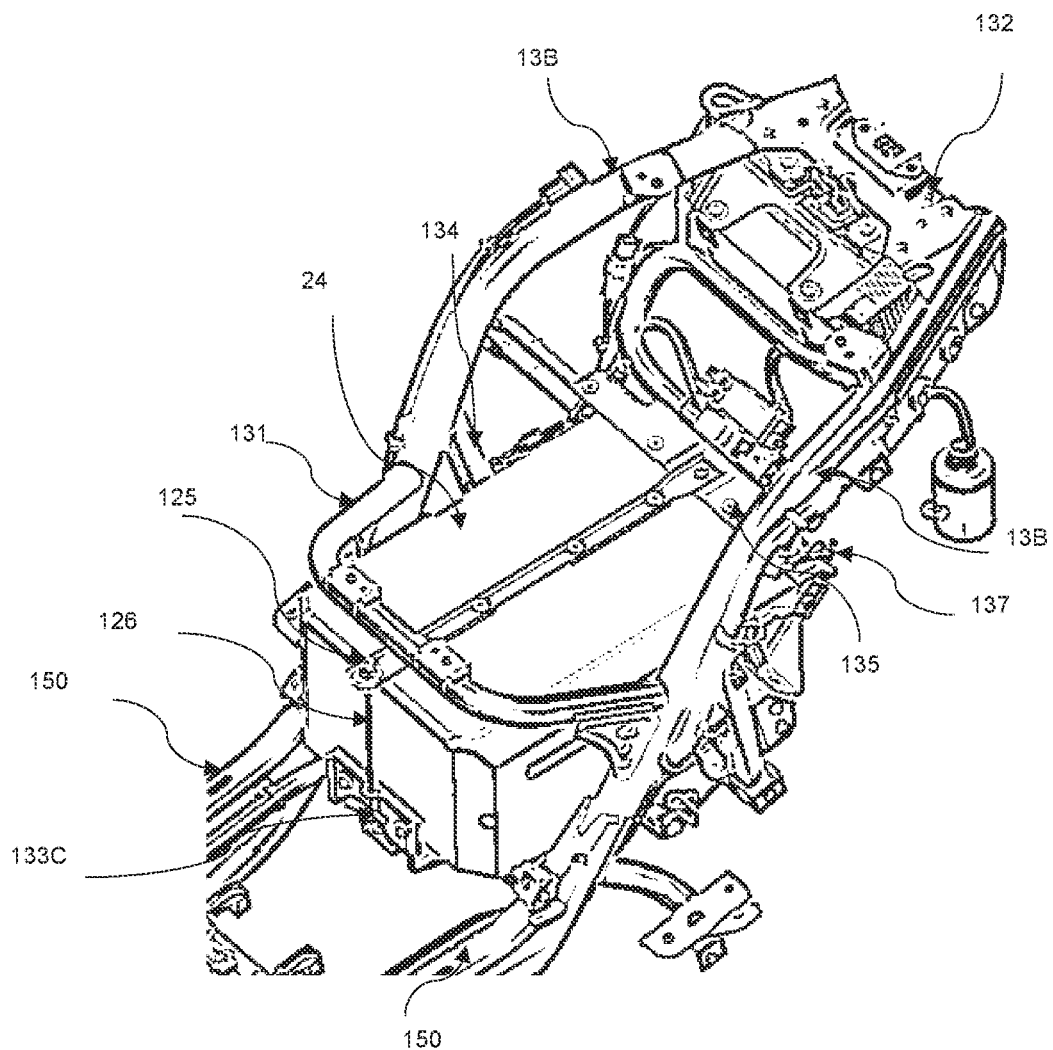
FIG. 4 is a partial isometric view of the frame of FIGS. 2 and 3 showing the relationship between the rear frame portion and a battery for the electric vehicle.
Figure 4:
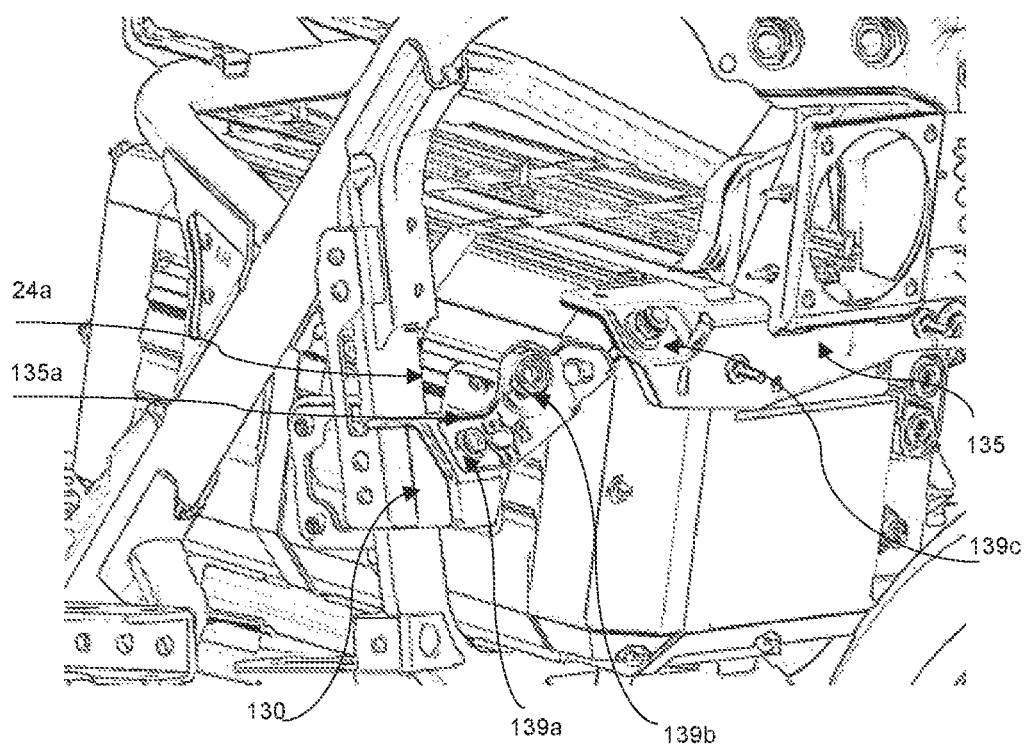

Connectivity box 200, shown in FIG. 2, is the core of the electronic system used in vehicle 10 including communications functionality and other electronic and controlling components. All the components in vehicle 10 are connected over a common CAN type network where data from various components can be transmitted to respective controlling units in digital form. For example battery 24 can share the information such as its state of charge or state of health to the connectivity box 200 over CAN network. The connectivity box 200 has a storage medium for storing data received from various components such as battery information, vehicle speed, distance travelled, driving pattern etc. The stored information may be transmitted directly to a mobile device or a remote server/cloud for processing as required, for example as described below. Control software updates can be transferred in the same way. The connectivity box 200 has suitable communication means such as Bluetooth, internet connectivity such as Wi-Fi or a telecommunication network capability using GSM SIM or all of these. The connectivity box 200 has also a GPS transmitter which helps in identifying the vehicle location. The data transmitted to the cloud or mobile device can be useful in various means such as identifying the vehicle location, understanding the driving pattern, error logs, identifying need to charge or change the battery etc. This data may also be useful from vehicle servicing or maintenance perspective and service alerts can be issued as required on a periodic basis.

Connectivity box 200 is located on the front side of scooter 10, specifically being mounted on head pipe 12, which is a position with a sufficient distance from the batteries 24, auxiliary battery to avoid magnetic interference on the electronic components contained in the connectivity box 200. Taking such considerations, including available space into account, the connectivity box 200 is best placed on the front side of vehicle 10 which also helps in easy wiring harness routing.

Scooter 10 also comprises an accident sensor (not shown) which senses the vehicle position and identifies the accident scenario. If any such scenario is detected then an alarm signal is sent to a mobile and also to a cloud with vehicle location information so that assistance can be given.

The charger unit 29 is used for charging battery module 24. It receives AC current from an external power supply, converts the supply to DC and supplies the power with specific current voltage to battery module 24 for charging the batteries. The amount of current and voltage as well as duration of current to be supplied to battery module 24 for charging purposes may fixed using a controller included within a battery management system. The input is given to a charger through cable 110 which thereafter controls the power supplied to battery module 24 according to instructions received from the battery management system. The control parameters for the battery charger 29 may vary based on the size and number of batteries used. The weight of the charger 29 is also considerable. In order to achieve better balance while driving, the charger 29 is accommodated on one side of the vehicle preferably on the opposite side to the ECU 100 location. This positioning helps in balancing the weight. Since the charger 29 is fixed on the vehicle 10 itself, its position needs to be safe and secured from external impacts and also from theft. To this end, charger 29 is firmly and securely mounted on the vehicle chassis 11 and the rear tubes. The charger 29 is preferably mounted on the opposite side of MCU (100) in order to better distribute the weight and achieve better balance. The charger 29 may be mounted to the vehicle frame with the help of suitable brackets.

Figure 14:
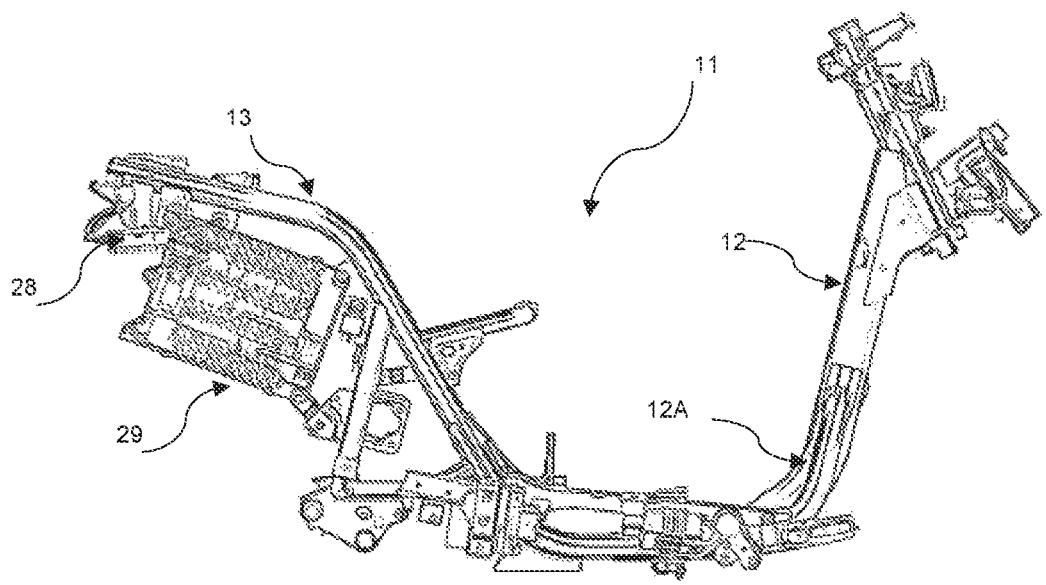
FIG. 14(a) is a schematic side view of the rear portion of the electric vehicle of FIGS. 1 and 5 illustrating mounting of charger unit, DC-DC convertor according to another embodiment of invention.
FIG. 14(b) is a schematic rear view of the rear portion of the electric vehicle of FIGS. 1 and 5 illustrating mounting of charger unit, DC-DC convertor according to another embodiment of invention.
Figure 14:
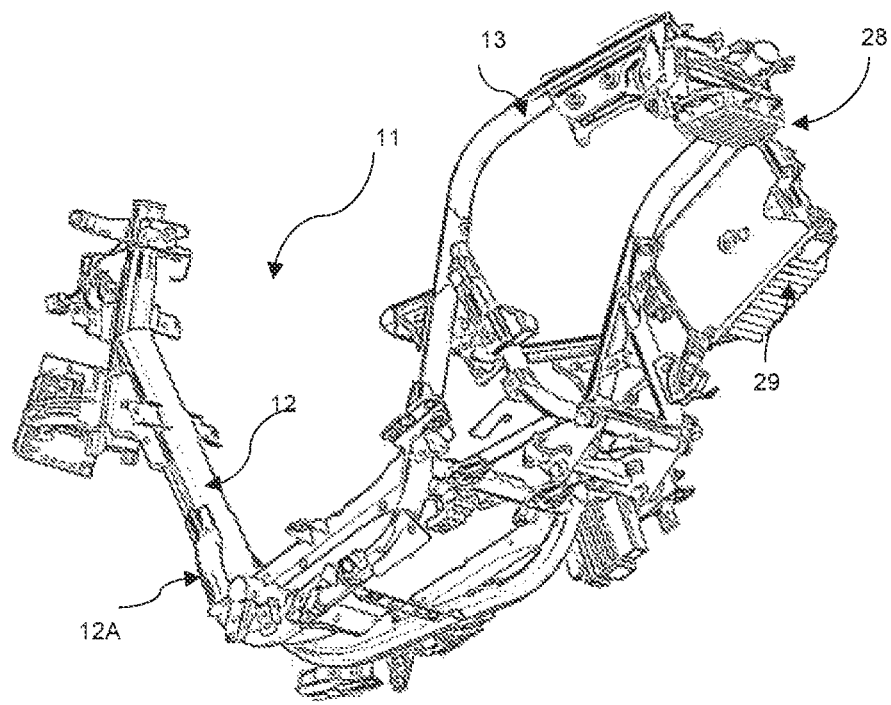

The battery 24 can therefore be charged on board the vehicle 10. However, the battery 24 can also be removed for charging. Scooter 10 is provided with a seat 103 as shown in FIGS. 12 and 14. The seat 103 is hinged at one point allowing opening to access the luggage compartment 105 and the charging point 129. The positioning of the battery module 24 within rear frame portion 13 enables the capacity of the luggage compartment 105 to be maximised for a particular scooter 10 and battery module 24 rating and dimensions.

Figure 13:
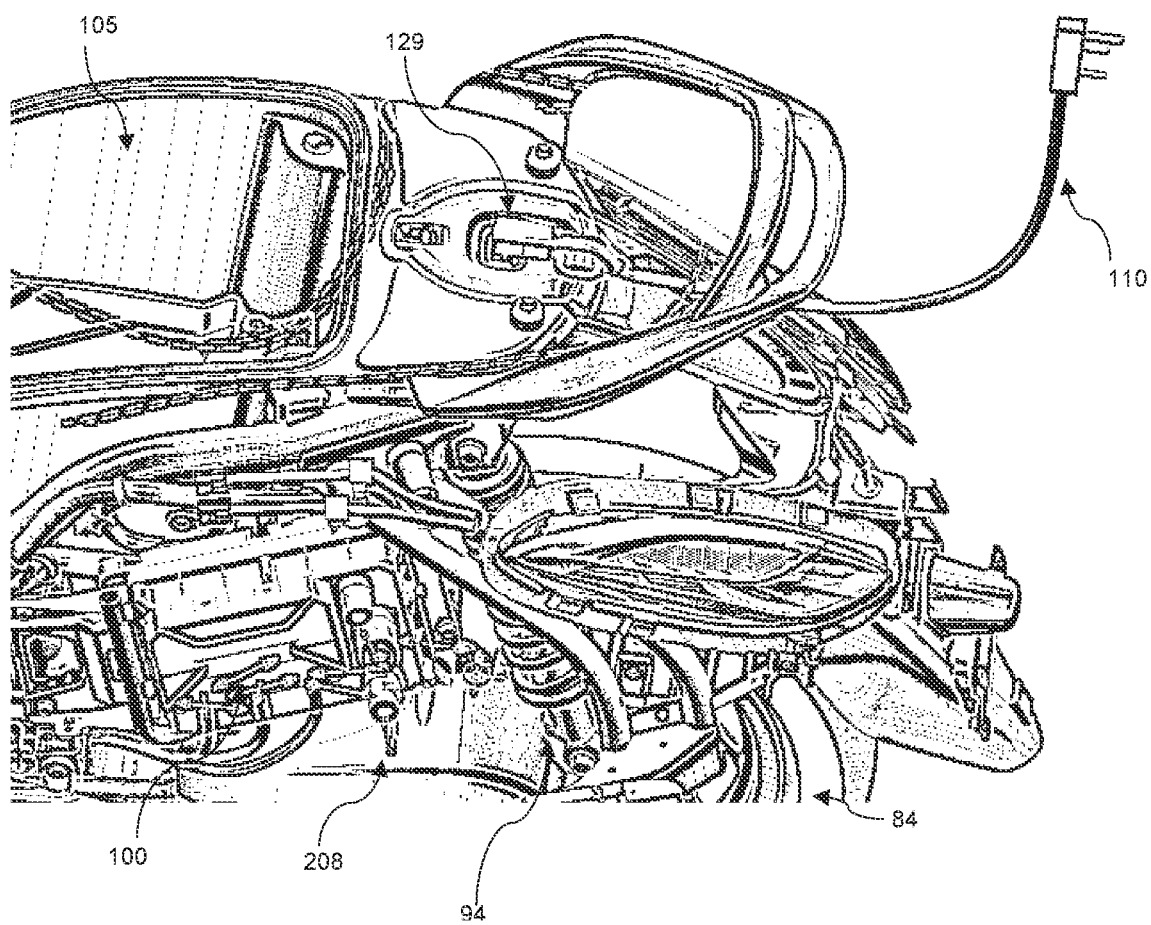
FIG. 13 is a second detail side view projected from FIG. 9 showing motor control unit, shock absorber and charging point arrangement.

Charging point 129 is provided inside seat 103 as shown in FIG. 13. For charging of battery 24, seat 103 is opened, the charger cable 110 is plugged into the charging point 129 and a power source and charging is started. Keeping seat 103 open for the duration of charging may not be preferred since the charger 110 needs to be secured from an anti-theft perspective as well as from environmental effects. Therefore, provision is made such that, during charging, the seat 103 can be closed and locked so that the charger 110 remains secured inside the luggage compartment 105 and cannot be removed without opening seat 103.

Referring to FIGS. 9 to 14, scooter 10 is provided with a rear mono-suspension i.e. only one shock absorber 94 is used to provide rear suspension to reduce cost. Shock absorber 94, which may be of SNS type as described in the Applicant's Indian Patent No. 695/MUM/2005, the contents of which are hereby incorporated herein by reference, is located at the rear of scooter 10 rather than at its centre. A front shock absorber is also provided.

The shock absorber 94 is connected on the motor-transmission 20/80 side of scooter 10 since load is greater on that side. One end of shock absorber 94 is connected to the casing 208C of the motor-transmission assembly 208 by bolt while the other end is connected to rear frame portion 13 by a mounting bracket 13C. A forward end of the Motor-Transmission Assembly is mounted at a bracket 198C which is welded on the protective frame structure 23 while the rear end of the motor-transmission assembly 208 is mounted at rear axle of the rear wheel 84. Motor-transmission assembly 208 is conveniently described in the Applicant's co-pending Indian Patent Application No. 201 821 0471 86 filed on 13 Dec. 2019, the contents of which are hereby incorporated herein by reference.

Figure 15:
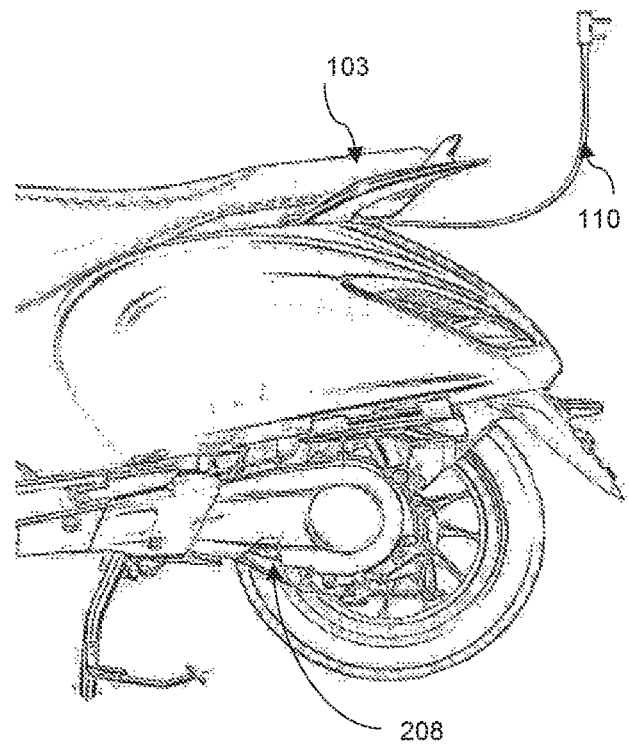
FIG. 15 is a schematic isometric view of the rear portion of the electric vehicle of FIGS. 1 and 5.

The FIG. 15 shows a schematic rear view of the vehicle according to the present invention with a charging cable 110 coming out from the seat 103 in the closed position. The motor-transmission assembly 208 is illustrated.

Modifications and variations to the electric vehicle described in the present specification may be apparent to skilled readers of this disclosure. Such modifications and variations are deemed within the scope of the present invention.

We claim:

1. A frame assembly for a two-wheeled electric vehicle with an electric battery module comprising:
   a head pipe and at least two rear tubes extending rearwardly from the head pipe, wherein at least a portion of the at least two rear tubes is extending upwardly towards a rear side of a two-wheeled electric vehicle and at least a portion of the at least two rear tubes is extending substantially horizontally towards the rear side of the two-wheeled electric vehicle in continuation to the upwardly extending portion of the at least two rear tubes;
   a protective frame structure for securely mounting an electric battery module substantially centrally and downwardly of the two-wheeled electric vehicle, wherein the protective frame structure includes a plurality of cross members connected to the upwardly extending portion of the at least two rear tubes from a front, a bottom and a rear side and creating a space for securely mounting the electric battery module such that at least a portion of the electric battery module is behind the upwardly extending portion of the at least two rear tubes and at least a portion of the electric battery module is located directly below the substantially horizontal portion of the at least two rear tubes, and further wherein the electric battery module is locked to the protective frame structure from the front and the rear side of the electric battery module.

2. The frame assembly for a two-wheeled electric vehicle as claimed in claim 1, wherein at least one cross member of the plurality of cross members is provided with locking means to securely fix the electric battery module from the front and the rear side to minimize vibrations and to prevent from theft.

3. The frame assembly for a two-wheeled electric vehicle as claimed in claim 1, wherein the locking means provided on the rear side of the electric battery module includes a rear mounting bracket used to lock the electric battery module position from the rear side by clamping the rear mounting bracket to the side brackets from both sides of the electric battery module, and further wherein the side brackets are fixed to the protective frame structure.

4. The frame assembly for a two-wheeled electric vehicle as claimed in claim 1, wherein at least one of the plurality of cross members is provided with a guiding means for conveniently mounting and removing the electric battery module from the protective frame structure for a charging or swapping purpose.

5. The frame assembly for a two-wheeled electric vehicle as claimed in claim 1, wherein the protective frame structure is provided with an opening from the front side or the back side of the two-wheeled electric vehicle to remove the electric battery module for charging or swapping purposes.

6. The frame assembly for a two-wheeled electric vehicle as claimed in claim 1, wherein the protective frame structure creates a space for mounting the electric battery module horizontally or vertically inside the protective frame structure.

7. The frame assembly for a two-wheeled electric vehicle as claimed in claim 1, wherein at least one of the plurality of cross members is provided with vibration isolating elements on which the electric battery module is mounted to reduce vibrations being transmitted to the electric battery module.

8. The frame assembly for a two-wheeled electric vehicle as claimed in claim 1, wherein the protective frame structure creates space for mounting the electric battery module substantially centrally along a width of the two-wheeled electric vehicle and substantially centrally along a length of the two-wheeled electric vehicle.

9. The frame assembly for a two-wheeled electric vehicle as claimed in claim 1, wherein a front cross member of the plurality of cross members connects the at least two rear tubes towards the front of the two-wheeled electric vehicle, and further wherein a rear cross member of the plurality of cross members connects the at least two rear tubes towards the rear of the vehicle, and a bottom cross member of the plurality of cross members connects to the rear cross member, and the at least two rear tubes are in a substantially horizontal direction to create a platform on which the electric battery module securely resides.

10. The frame assembly for a two-wheeled electric vehicle as claimed in claim 9, wherein the front cross member extends substantially horizontally over a top surface of the electric battery module to restrict any vertical movement of the electric battery module, the rear cross member is provided with a rear mounting bracket to further restrict movement of the electric battery module, and the bottom cross member is provided with a first forward cross member used to restrict forward movement of the electric battery module using a bolt which extends till a height of the electric battery module and connects the rear mounting bracket through a locking plate.

11. The frame assembly for a two-wheeled electric vehicle as claimed in claim 1, wherein the protective frame structure provides a space for mounting a storage box on the at least two rear tubes above the electric battery module such that the electric battery module does not extend forwardly beyond dimensions of the storage box when viewed from a side of the two-wheeled electric vehicle.

12. The frame assembly for a two-wheeled electric vehicle as claimed in claim 1, wherein the at least two rear tubes are provided with at least two longitudinal frame members substantially horizontal and parallel to the horizontal portion of each of the at least two rear tubes, wherein the longitudinal frame members allow mounting of foot panels such that one foot panel is mounted on top of the longitudinal frame members while another foot panel is mounted on bottom of the longitudinal frame members and respective sides of the two foot panels are covered with side members, thereby creating a hollow space between the two foot panels, which is configured to guide a ram air towards the electrical battery module for battery cooling.

13. The frame assembly for a two-wheeled electric vehicle as claimed in claim 12, wherein the hollow space created by the horizontal portion of the at least two rear tubes is provided with mounting means for accommodating an auxiliary battery, a wiring harness, or a motor control unit.

14. The frame assembly for a two-wheeled electric vehicle as claimed in claim 1, wherein the at least two rear tubes are provided with mounting means for mounting a motor control unit (MCU), such that the MCU is mounted proximate to the electric battery module on the left hand side of the vehicle.

15. The frame assembly for a two-wheeled electric vehicle as claimed in claim 1, wherein the at least two rear tubes are provided with a mounting provision for mounting a DC-DC converter at an end of the rear tubes.

16. The frame assembly for a two-wheeled electric vehicle as claimed in claim 1, wherein the head pipe is provided with mounting provision for mounting a connectivity box on a front side of the two-wheeled electric vehicle.

17. The frame assembly for a two-wheeled electric vehicle as claimed in claim 1, wherein the rear tube is provided with a mounting provision for mounting a charger unit used for charging the electric battery module on a right hand side of the vehicle.

18. The frame assembly for a two-wheeled electric vehicle as claimed in claim 1, wherein the protective frame structure is provided with a bracket for mounting a forward end of a motor-transmission assembly.

19. The frame assembly for a two-wheeled electric vehicle as claimed in claim 18, wherein the motor-transmission assembly is provided with a casing that acts as a swing arm.

* * * * *